(12) United States Patent
Fujimura et al.

(10) Patent No.: US 12,503,821 B2
(45) Date of Patent: Dec. 23, 2025

(54) MAGNETIC MARKER INSTALLATION METHOD AND SUPPLEMENTAL TOOL FOR INSTALLING MAGNETIC MARKER

(71) Applicant: Aichi Steel Corporation, Tokai (JP)

(72) Inventors: Ryota Fujimura, Tokai (JP); Takayuki Ando, Tokai (JP); Tetsuya Iwase, Tokai (JP); Takashi Shimoto, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 0 days.

(21) Appl. No.: 19/185,250

(22) Filed: Apr. 22, 2025

(65) Prior Publication Data

US 2025/0333915 A1    Oct. 30, 2025

(30) Foreign Application Priority Data

Apr. 24, 2024    (JP) ................. 2024-070526

(51) Int. Cl.
*E01C 23/18*    (2006.01)
*E01C 23/16*    (2006.01)
*E01F 9/512*    (2016.01)

(52) U.S. Cl.
CPC ............ *E01C 23/18* (2013.01); *E01C 23/163* (2013.01); *E01F 9/512* (2016.02)

(58) Field of Classification Search
None
See application file for complete search history.

(56) References Cited

U.S. PATENT DOCUMENTS

| 10,632,892 | B2* | 4/2020 | Yamamoto | B60P 3/00 |
| 10,801,170 | B2* | 10/2020 | Yamamoto | E01F 11/00 |
| 11,236,476 | B2* | 2/2022 | Yamamoto | E01F 11/00 |
| 11,242,659 | B2* | 2/2022 | Yamamoto | G05D 1/0261 |

(Continued)

FOREIGN PATENT DOCUMENTS

| CN | 103522298 A | * | 1/2014 |
| JP | 2000212922 A | * | 8/2000 |

(Continued)

OTHER PUBLICATIONS

Translation of CN-103522298-A (Year: 2014).*

*Primary Examiner* — Jacob J Cigna
(74) *Attorney, Agent, or Firm* — XSENSUS LLP

(57) ABSTRACT

A supplemental tool for installation that can achieve both high magnetic-marker installation efficiency and high magnetic-marker installation accuracy is provided. A supplemental tool for arranging a magnetic marker in an accommodation hole provided by being drilled in a road surface includes a columnar-shaped retaining member including a retaining surface for the magnetic marker at an end portion in an axial direction and a detaching member combined with the retaining member so as to be able to move to the axial direction as opposed to the retaining member. A combination of the retaining member and the detaching member is such that detaching member can abut on the magnetic marker retained on the retaining surface, and it is configured so that the retaining member can retreat in the axial direction to a side away from the magnetic marker keeping a state in which the detaching member abuts on the magnetic marker.

7 Claims, 18 Drawing Sheets

(56) References Cited

U.S. PATENT DOCUMENTS

| | | |
|---|---|---|
| 11,808,575 B2 | 11/2023 | Yamamoto et al. |
| 11,906,307 B2 | 2/2024 | Yamamoto et al. |
| 12,338,590 B2 * | 6/2025 | Tasaka .................... E01F 11/00 |
| 2022/0316159 A1 * | 10/2022 | Tasaka ................ E01C 23/0993 |

FOREIGN PATENT DOCUMENTS

| | | | |
|---|---|---|---|
| JP | 6920975 B2 | 8/2021 | |
| JP | 7260856 B2 | 4/2023 | |
| WO | WO-2019239825 A1 * | 12/2019 | ................ E01F 9/30 |

* cited by examiner

MAGNETIC MARKER INSTALLATION METHOD AND SUPPLEMENTAL TOOL FOR INSTALLING MAGNETIC MARKER

CROSS-REFERENCE TO RELATED APPLICATION

The present application claims priority to Japanese application number 2024-070526 filed in the Japanese Patent Office on Apr. 24, 2024, the entire contents of which are incorporated herein by reference.

BACKGROUND OF THE INVENTION

The present invention relates to an installation method for laying a magnetic marker in a traveling road of a vehicle and a supplemental tool for installing the magnetic marker.

Conventionally, a system for achieving automatic steering for a vehicle by using magnetic markers arranged along a vehicle's traveling road has been suggested (for example, refer to Japanese Patent No. 7260856). According to this system, by assisting driving for the vehicle, it is possible to reduce driver's loads and achieve automatic driving for the vehicle.

For example, Japanese Patent No. 6920975 discloses an installation cart including drills for providing an accommodation hole for the magnetic marker in a road surface by drilling. In this installation cart, the drills are arranged at the front and rear of a vehicle body. By operating the front and rear drills with the position of the installation cart being fixed, it is possible to efficiently provide two accommodation holes with a defined separation distance.

Japanese Patent No. 6920975 describes a laying mode in which portions where two magnetic markers are laid with the defined separation distance are provided along a traveling road with 10 m-pitches. For example, if the magnetic markers are laid in a zone of 20 km, the number of the above-described laying portions is 2000, and 4000 magnetic markers are required to be laid.

SUMMARY OF THE INVENTION

However, the conventional magnetic marker system has the following problem. That is, there is a technical problem in which, while magnetic-marker installation accuracy is ensured, it is required to enhance installation efficiency by reducing installation time of each magnetic marker.

The present invention was made in view of the conventional problem described above, and is to provide a magnetic marker installation method and a supplemental tool for installing the magnetic marker, which can achieve both high installation accuracy and high installation efficiency.

One aspect of the present invention is directed to a supplemental tool for installing a magnetic marker for arranging, when the magnetic marker externally acting with magnetism is installed, the magnetic marker in an accommodation hole provided by being drilled in a road surface, the supplemental tool for installation including:
a columnar-shaped retaining member including a retaining surface for the magnetic marker at an end portion in an axial direction of the retaining member; and
a detaching member to be combined with the retaining member so as to be movable in the axial direction with respect to the retaining member, wherein
in a combination of the retaining member and the detaching member, the detaching member can be positioned so as to abut on the magnetic marker retained on the retaining surface, and the retaining member is configured to retreat in the axial direction to a side away from the magnetic marker keeping a state in which the detaching member abuts on the magnetic marker.

One aspect of the present invention is directed to a magnetic marker installation method for arranging, when a magnetic marker externally acting with magnetism is installed, the magnetic marker in an accommodation hole provided by being drilled in a road surface, the magnetic marker installation method including:
providing a columnar-shaped retaining member including a retaining surface for the magnetic marker at an end portion in an axial direction of the retaining member, and a detaching member to be combined with the retaining member so as to be movable in the axial direction with respect to the retaining member,
inserting the retaining member into the accommodation hole with the retaining surface retaining the magnetic marker on a tip side, and
retreating the retaining member in the axial direction to a side away from the magnetic marker and pulling out the retaining member from the accommodation hole keeping a state in which the detaching member abuts on the magnetic marker retained on the retaining surface.

The present invention is an invention for accurately arranging the magnetic marker in the accommodation hole. In the present invention, the columnar-shaped retaining member including the retaining surface for the magnetic marker at the end portion in the axial direction of the retaining member and the detaching member to be combined with the retaining member so as to be movable in the axial direction with respect to the retaining member are used. When using the combination of the retaining member and the detaching member, it is possible to arrange the magnetic marker in the accommodation hole as follows. By inserting the retaining member retaining the magnetic marker into the accommodation hole and then retreating the retaining member as the detaching member abuts on the magnetic marker.

According to the present invention, it is possible to retreat the retaining member while pressing the magnetic marker by the detaching member. By retreating the retaining member in this manner, the magnetic force acting between the retaining member and the magnetic marker does not disturb the attitude of the magnetic marker. With the installation method or the supplemental tool for installation having no possibility of disturbing the attitude of the magnetic marker in the accommodation hole, efficiency of a work for arranging the magnetic marker in the accommodation hole can be improved.

As described above, the present invention is an excellent invention that can achieve both high magnetic-marker installation efficiency and high magnetic-marker installation accuracy.

DETAILED DESCRIPTION OF THE INVENTION

Figure 1:
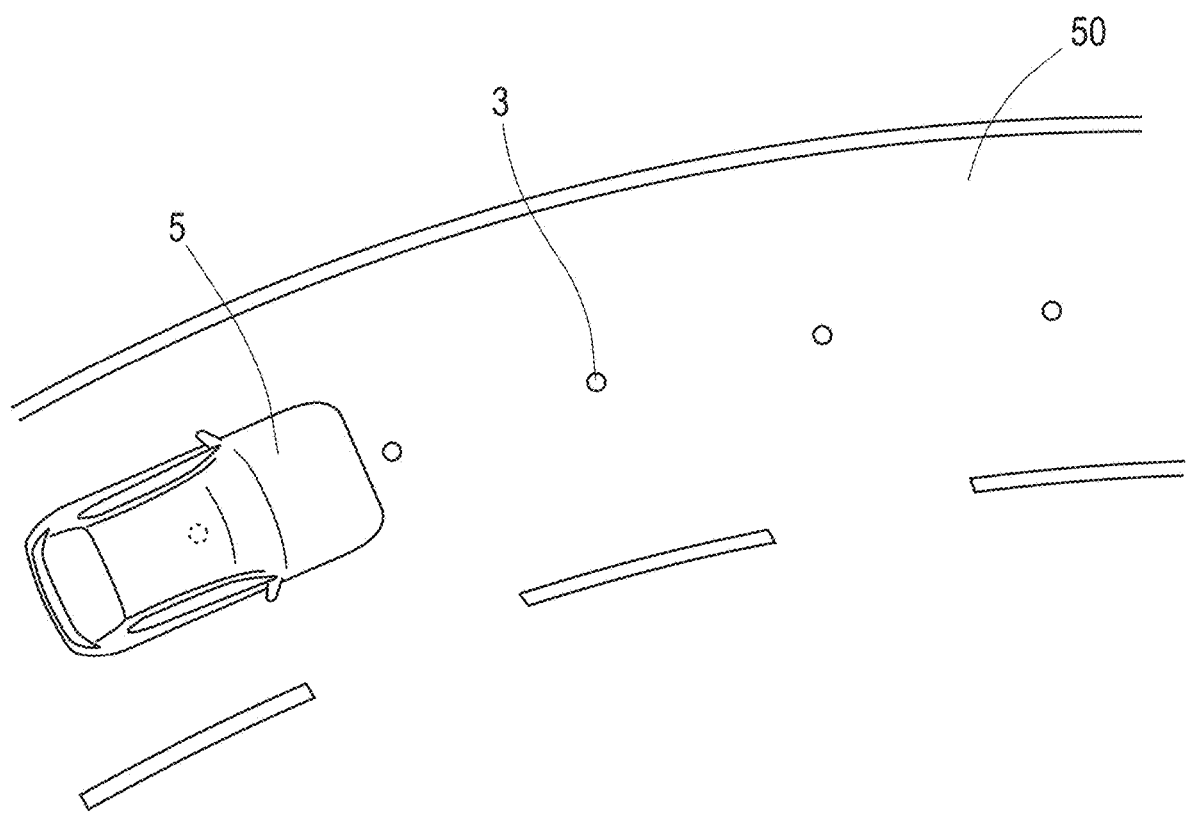
FIG. 1 is a descriptive diagram of a traveling road where magnetic markers are laid.
Figure 2:
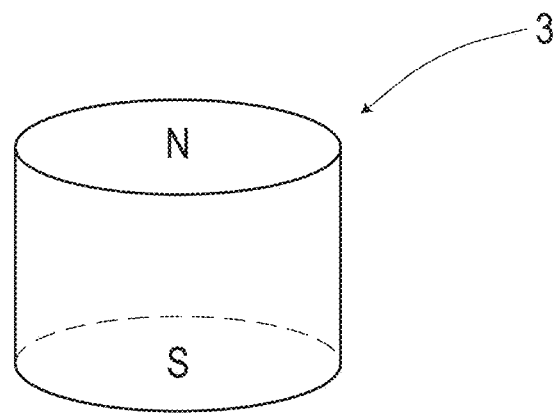
FIG. 2 is a perspective view of a magnetic marker having a height of 30 mm.
Figure 3:
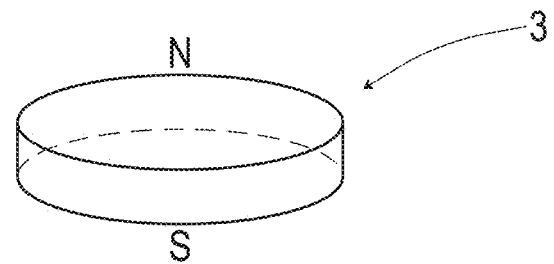
FIG. 3 is a perspective view of a magnetic marker having a height of 5 mm.

Modes of the present invention are specifically described by using the following embodiments.

First Embodiment

The present embodiment is an example regarding supplemental tool 1 and installation method useful for efficiently installing magnetic marker 3 in traveling road 50 of vehicle 5. Details of this are described by using FIG. 1 to FIG. 18.

Magnetic marker 3 of the present embodiment is a magnetic product to be laid at a predetermined spacing along traveling road 50 of vehicle 5. When using magnetic markers 3 laid along traveling road 50, it is possible to achieve driving assists, for example, lane following traveling of vehicle 5 by automatic steering and lane departure warning.

Magnetic marker 3 is a cylindrically-shaped ferrite plastic magnet. Magnetic marker 3 is this magnet itself, exhibiting a cylindrical shape like the magnet. In magnetic marker 3, one end face of the cylindrical shape forms the N pole and the other face forms the S pole. The magnetizing direction of magnetic marker 3 goes along the axial direction of the cylindrical shape.

Magnetic marker 3 has a diameter of 30 mm. The dimension (height) of magnetic marker 3 in the axial direction has two types, 20 mm, and 5 mm. Magnetic marker 3 having a height of 20 mm and the diameter of 30 mm (FIG. 2) is a magnetic marker for vehicles having a high vehicle height, such as buses. Magnetic marker 3 having a height of 5 mm and the diameter of 30 mm (FIG. 3) is a magnetic marker for vehicles that, for example, carry goods in facilities such as factories.

Figure 4:
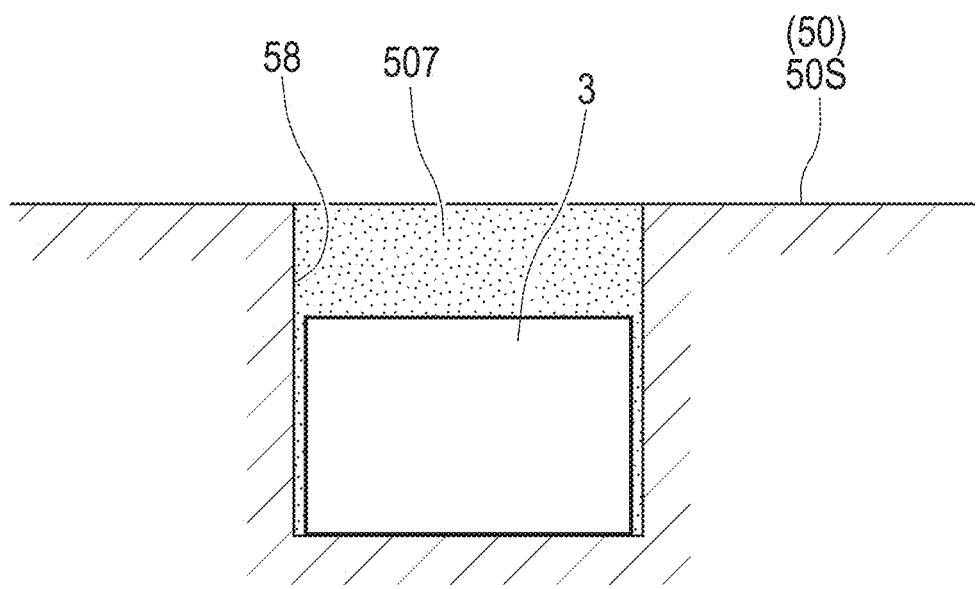
FIG. 4 is a descriptive diagram of a buried state of the magnetic marker having the height of 30 mm.
Figure 5:
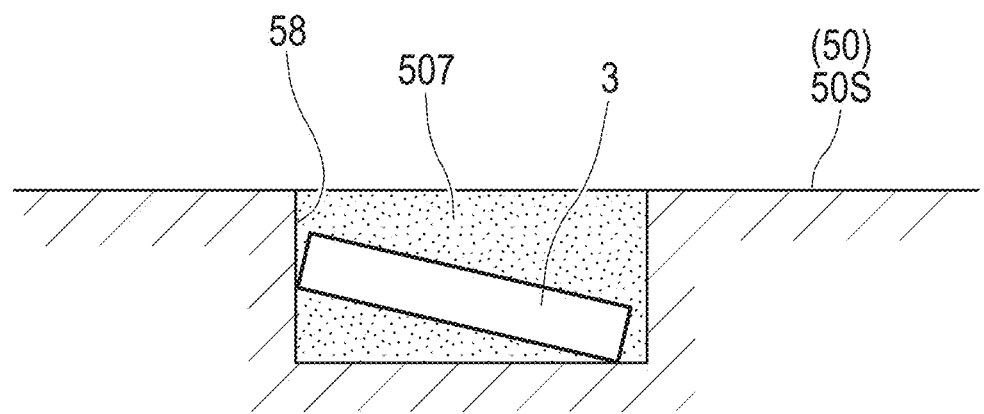
FIG. 5 is a descriptive diagram of a buried state of the magnetic marker having the height of 5 mm.

Magnetic marker 3 is, as in FIG. 4 taking magnetic marker 3 having the height of 20 mm as an example, laid by using accommodation hole 58 provided by being drilled in road surface 50S. Magnetic marker 3 is arranged in accommodation hole 58 and the hole is then backfilled with road repair material 507. Road repair material 507 is a pavement material such as asphalt or a repair material having resin as a main material. If the hole diameter of accommodation hole 58 is small, such as slightly larger than 30 mm, there is a high possibility that the work for arranging magnetic marker 3 cannot be efficiently performed. On the other hand, if the hole diameter of accommodation hole 58 is excessively large, magnetic marker 3 tends to tilt in accommodation hole 58. In consideration of these, in the present embodiment, the diameter of accommodation hole 58 is set at 35 mm.

In the case of magnetic marker 3 having the height of 20 mm, the dimension in the axial direction is equal to or larger than half of the diameter of 35 mm, which is the hole diameter of accommodation hole 58. In this case, there is a low possibility of magnetic marker 3 tilting in accommodation hole 58 and also a low possibility of its axial direction being deviated from the vertical direction. By contrast, in the case of magnetic marker 3 having the height of 5 mm, the dimension in the height direction is insufficient with respect to the diameter of 35 mm, which is the hole diameter of accommodation hole 58. In this case, magnetic marker 3 tends to tilt in accommodation hole 58 (refer to FIG. 5). When magnetic marker 3 tilts in accommodation hole 58, the axial direction (height direction) of magnetic marker 3 is deviated from the vertical direction. The axial direction of magnetic marker 3 of the present embodiment coincides with the magnetizing direction. If the magnetizing direction of magnetic marker 3 is deviated from the vertical direction, positioning accuracy on a vehicle 5 side using magnetic marker 3 is impaired.

For this reason, to arrange magnetic marker 3 having the height of 5 mm in accommodation hole 58, it is required to sufficiently pay attention so that magnetic marker 3 does not tilt in accommodation hole 58. This requirement can become a factor in inhibiting work efficiency. Supplemental tool 1 of the present embodiment is a jig for installation to achieve both installation accuracy of magnetic marker 3 (accuracy of arrangement in accommodation hole 58) and work efficiency.

Figure 6:
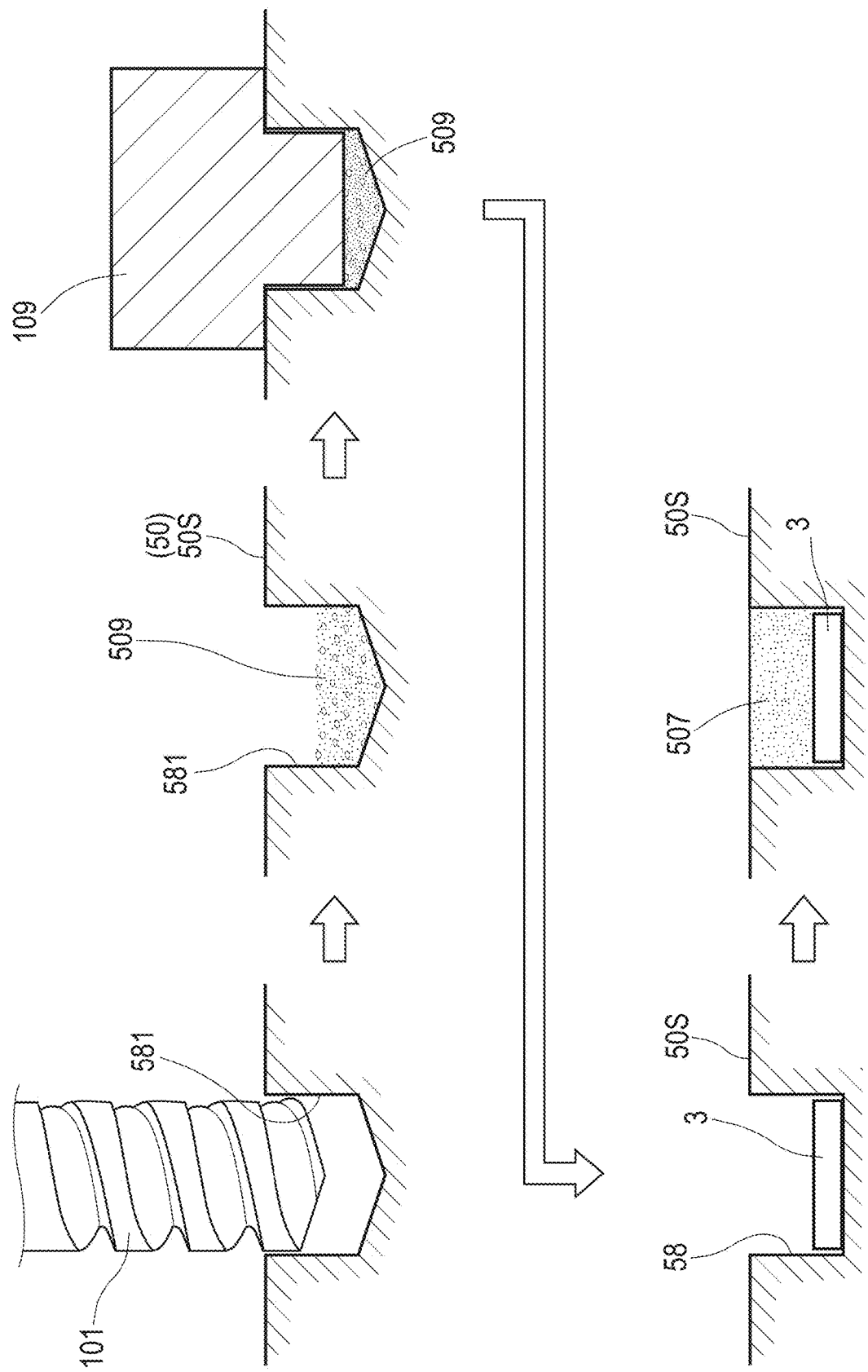
FIG. 6 is a diagram describing a procedure of installing a magnetic marker.
Figure 7:
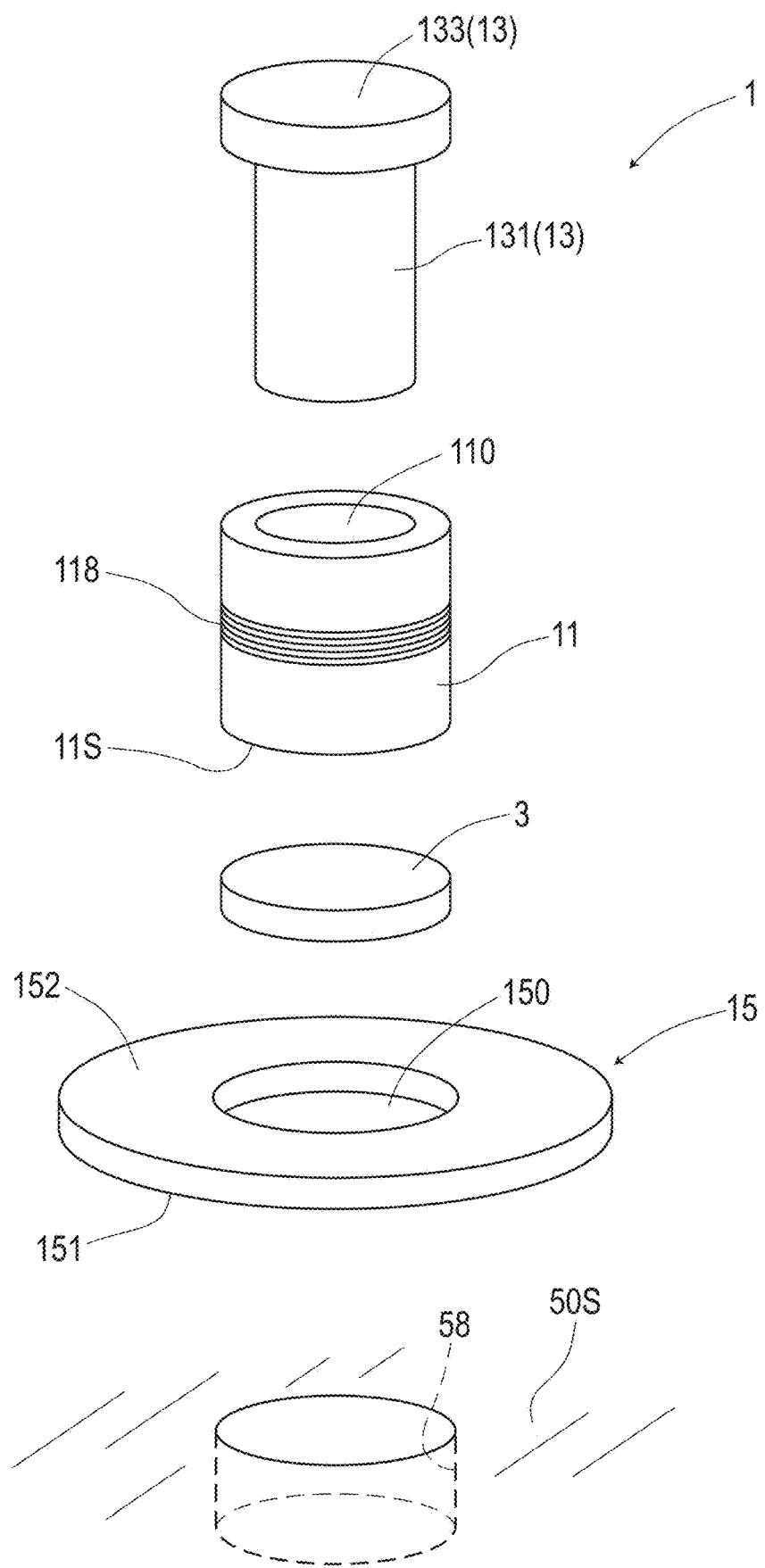
FIG. 7 is a configuration diagram of a supplemental tool.
Figure 8:
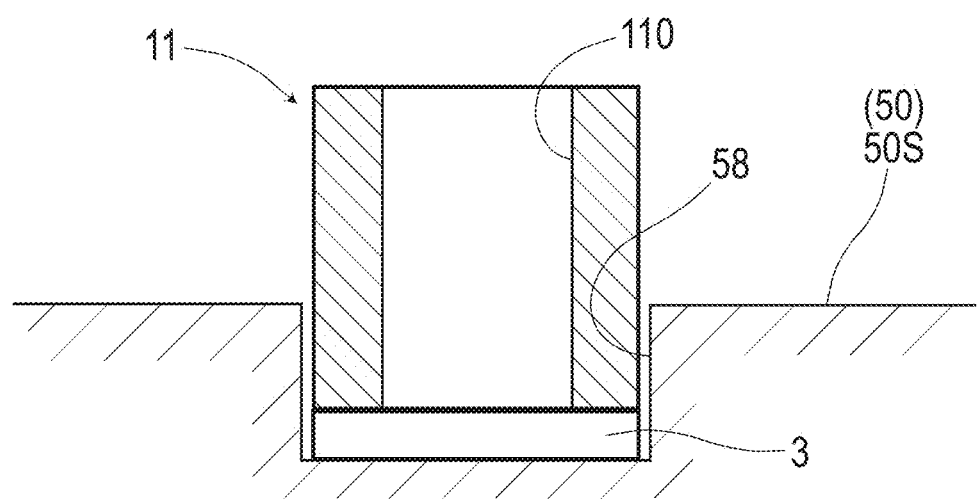
FIG. 8 is a descriptive diagram depicting a state in which the magnetic marker is arranged in an accommodation hole by using a retaining member.
Figure 9:
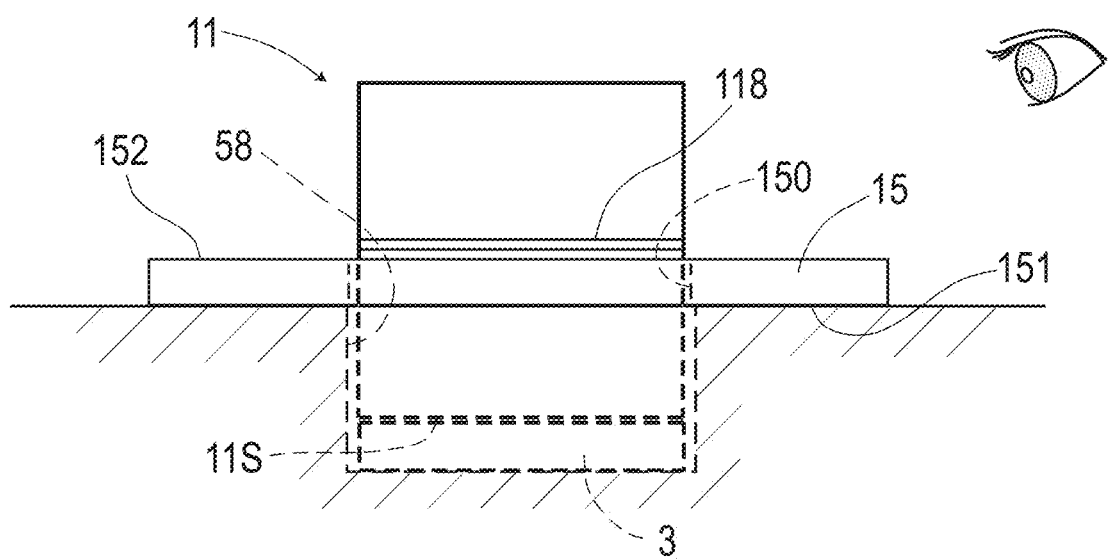
FIG. 9 is a descriptive diagram depicting a state in which the insertion depth of the retaining member in the accommodation hole is measured.

Here, with reference to FIG. 6, a procedure of installing magnetic marker 3 is briefly described. To install magnetic marker 3, accommodation hole 58 is provided by being drilled in road surface 50S by using drill 101. In drill 101, the drilling depth is controlled, and hole 581 having a predetermined depth can be provided by being drilled. In hole 581 provided by drill 101, sand 509 is supplied and rolled. Rolling is performed by using rolling tool 109 formed of a shaft portion to be inserted into hole 581 and a flange portion having a diameter larger than the hole. The shaft portion has a length of 15 mm.

By rolling the bottom surface of hole 581 by using rolling tool 109 so that the flange portion makes contact with road surface 50S, it is possible to accurately form accommodation hole 58 having a depth of 15 mm. After magnetic marker 3 is arranged in accommodation hole 58, accommodation hole 58 is backfilled by using road repair material 507, thereby completing installation of magnetic marker 3. Supplemental tool 1 of the present embodiment can be utilized when magnetic marker 3 having the height of 5 mm (refer to FIG. 3) is arranged in accommodation hole 58. By using supplemental tool 1 of the present embodiment, it is possible to achieve both high work efficiency and high arrangement accuracy.

(Configuration of Supplemental Tool)

Supplemental tool 1 (FIG. 7) of the present embodiment is configured to include cylindrically-shaped retaining member 11 and detaching member 13 including shaft portion 131. To supplemental tool 1 of the present embodiment, reference plate 15 for measuring the insertion depth of retaining member 11 into accommodation hole 58 is combined. Supplemental tool 1 is a work assist tool for assisting a work for arranging magnetic marker 3 in accommodation hole 58. By using supplemental tool 1, it is possible to suppress unevenness in attitude of magnetic marker 3 (height of 5 mm) arranged in accommodation hole 58.

Retaining member 11 is a member for retaining magnetic marker 3 when arranging magnetic marker 3 in accommodation hole 58. Retaining member 11 is the member made of a carbon steel, which is one example of a soft magnetic material, the member onto which a magnet is to be suctioned. Retaining member 11 uses the magnetic force of magnetic marker 3 itself as a magnet to suction and retain magnetic marker 3. Note that examples of soft magnetic material include a carbon steel such as S45C, soft iron, electromagnetic soft iron (silicon steel), structural steel such as SC46, and the like.

Retaining member 11 is a cylindrically-shaped member provided with through-hole 110 along an axial direction (direction of the center axis). Retaining member 11 has an outer diameter of 30 mm, an inner diameter of 20 mm, and a total length of 30 mm. Retaining member 11 has a defined orientation in the axial direction. A side to be inserted into accommodation hole 58 is a tip side, and its opposite side is a rear end side. An end face on a tip side to be inserted into accommodation hole 58 is retaining surface 11S that can retain magnetic marker 3 by the magnetic force of magnetic marker 3.

On the outer circumferential surface of retaining member 11, five scale lines 118 for measuring the insertion depth into accommodation hole 58 are provided. Scale lines 118 are one example of a mark or scale. Scale lines 118 are lines each having a width of 1 mm over the entire outer circumference of retaining member 11, and are provided so as not to have a gap between adjacent lines 118. Five scale lines 118 are formed in a range of a width of 5 mm from 13 mm to 18 mm from retaining surface 11S to the axial direction. Five scale lines 118 can be each distinguished from its adjacent scale line 118 by color. The colors of scale lines 118 are red, yellow, blue, yellow, and red from a side close to retaining surface 11S. The combination of red, yellow, and blue is a combination of colors that can be identified by workers with color-vision deficiency.

Detaching member 13 is a member that presses magnetic marker 3 when retaining member 11 is separated from magnetic marker 3 arranged in accommodation hole 58. Detaching member 13 is a member made of a resin material such as nonmagnetic nylon, and does not suction a magnet. Note that detaching member 13 may be a member made of a nonmagnetic nonmetallic material such as a resin material or may be a nonmagnetic material (nonmagnetic metal material) such as a stainless steel or copper alloy. Detaching member 13 includes shaft portion 131 having an outer diameter of 19 mm and a length of 40 mm and also has flange portion 133 having an outer diameter of 30 mm at one end portion of shaft portion 131. Shaft portion 131 is inserted into through-hole 110 of retaining member 11.

In a combination of retaining member 11 and detaching member 13, relative advance and retreat therebetween in the axial direction can be made. With shaft portion 131 inserted into through-hole 110 of retaining member 11, detaching member 13 can make advancing movement (displacement) with respect to retaining member 11. Also, in a state in which shaft portion 131 of detaching member 13 is arranged to be inserted into through-hole 110, retaining member 11 can make retreating movement (displacement) in the axial direction with respect to detaching member 13.

Reference plate 15 is one example of a measuring member for measuring the insertion depth of retaining member 11 into accommodation hole 58. Reference plate 15 has a flat plate shape with an outer diameter of 100 mm and a plate thickness of 5 mm. At the center of reference plate 15, arrangement hole 150 having an inner diameter of 31 mm is provided. Arrangement hole 150 is a hole for letting retaining member 11 arranged therethrough. In the present embodiment, a circular hole is exemplarily taken as arrangement hole 150 forming one example of an arrangement portion. The arrangement portion may be any having an inner circumferential shape along part of the outer circumference of retaining member 11 and, for example, may be a semicircular recess.

There is no distinction between front and back surfaces of reference plate 15. When reference plate 15 is mounted on road surface 50S with retaining member 11 penetrating therethrough, a surface on a road surface 50S side forms a grounding portion 151 facing road surface 50S. The other surface facing upward forms reference portion 152 for comparing a relative position in a height direction to scale lines 118 of retaining member 11.

(Magnetic Marker Arranging Work)

Details of the work for arranging magnetic marker 3 in accommodation hole 58 by using supplemental tool 1 are described. By using supplemental tool 1, it is possible to efficiently perform the work with high accuracy, irrespective of the level of work skill, whether the worker has color-vision deficiency, and so forth.

Single retaining member 11 before assembled with detaching member 13 is prepared to cause magnetic marker 3 to be suctioned onto retaining surface 11S. With retaining surface 11S retaining magnetic marker 3 on the tip side, retaining member 11 is inserted into accommodation hole 58. By inserting retaining member 11 so that the tip side presses the bottom surface (FIG. 8), it is possible to mount magnetic marker 3 on the bottom surface of accommodation hole 58.

Retaining member 11 inserted into accommodation hole 58 presses magnetic marker 3 onto the bottom surface of accommodation hole 58 by its own weight. Here, accommodation hole 58 has the depth of 15 mm, and magnetic marker 3 has the height (dimension in the axial direction) of 5 mm. If the arrangement of magnetic marker 3 in accommodation hole 58 is appropriate, the tip side of retaining member 11 is inserted by 10 mm into accommodation hole 58. To measure the insertion depth of retaining member 11, reference plate 15 can be used.

Reference plate 15 is externally inserted to retaining member 11 which is standing on road surface 50S with its tip side inserted into accommodation hole 58. Reference plate 15 has the inner diameter slightly larger than the outer diameter of retaining member 11. Thus, reference plate 15 is mounted on road surface 50S with retaining member 11 penetrating therethrough. Reference plate 15 of the present embodiment forms the flat plate shape, and there is no distinction between front and back surfaces. The front and back surfaces can be both used as grounding portion 151 facing road surface 50S. A surface facing road surface 50S functions as grounding portion 151.

Reference plate 15 has the plate thickness of 5 mm. The height of the upper surface of reference plate 15 with reference to road surface 50S is 5 mm. When the arrangement depth of magnetic marker 3 in accommodation hole 58 is appropriate and the tilt of magnetic marker 3 is sufficiently small, the insertion depth of retaining member 11 is 10 mm, as described above. Thus, when the arrangement of magnetic marker 3 is appropriate, the position by 10 mm from retaining surface 11S coincides with the height of road surface 50S, and the upper surface of reference plate 15 coincides with the position by 15 mm from retaining surface 11S. As described above, in the range of 13 mm to 18 mm from retaining surface 11S in the axial direction on the outer circumferential surface of retaining member 11, five scale lines 118 each having a width of 1 mm are provided. When the arrangement of magnetic marker 3 in accommodation hole 58 is appropriate, as in FIG. 9, part of scale lines 118 can be visually recognized from an outside, and part of scale lines 118 cannot be visually recognized as being hidden by reference plate 15. That is, the upper surface of reference plate 15 functions as reference portion 152 for comparing the position in the height direction to scale lines 118.

By using reference plate 15, with workers visually recognizing the number of scale lines 118 and the combination of colors, it is possible to confirm if the insertion depth of retaining member 11 is appropriate. In particular, in the configuration of the present embodiment, five scale lines 118 are color-coded so that workers with color-vision deficiency can distinguish them by color in the same way as workers without color-vision deficiency can. With the configuration of the present embodiment, it is possible to accurately determine whether the insertion depth of retaining member 11 is appropriate irrespective of whether the worker has color-vision deficiency.

Figure 10:
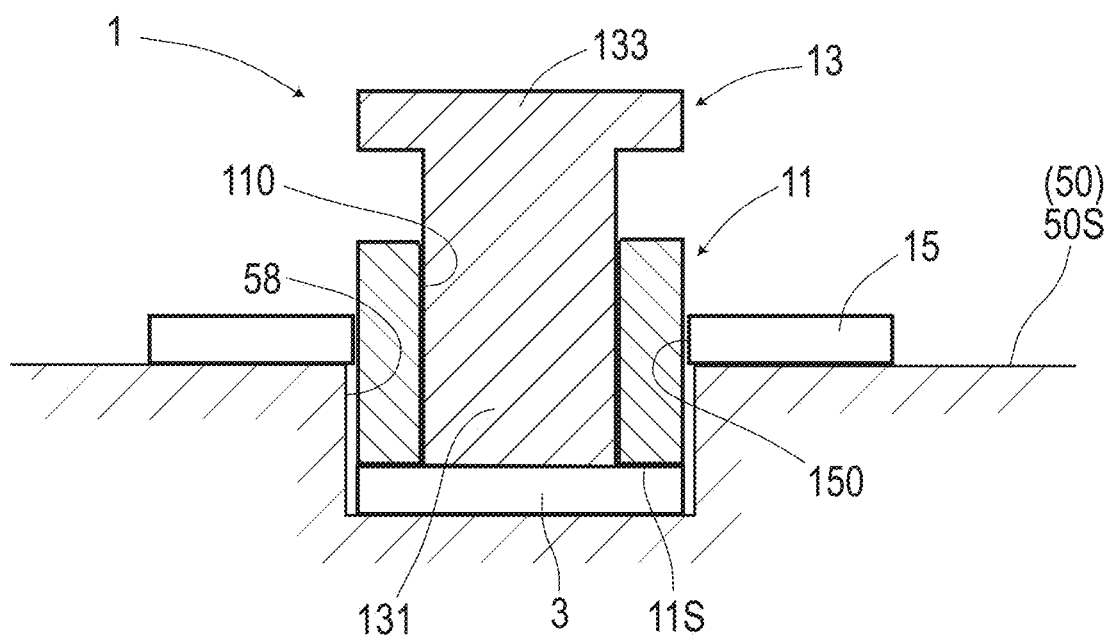
FIG. 10 is a descriptive diagram depicting a state in which a detaching member abuts on the magnetic marker.

After it is confirmed that the insertion depth of retaining member 11 is appropriate, shaft portion 131 of detaching member 13 is inserted into through-hole 110 of retaining member 11. With detaching member 13 moved to advance in the axial direction with respect to retaining member 11 in this manner, the tip of shaft portion 131 is pressed onto magnetic marker 3 (FIG. 10). Here, shaft portion 131 has the length of 40 mm, which is longer than the length of 30 mm of retaining member 11 in the axial direction. In a state in which the tip of shaft portion 131 is pressed onto magnetic marker 3, shaft portion 131 is left by 10 mm on a rear end side of retaining member 11.

Figure 11:
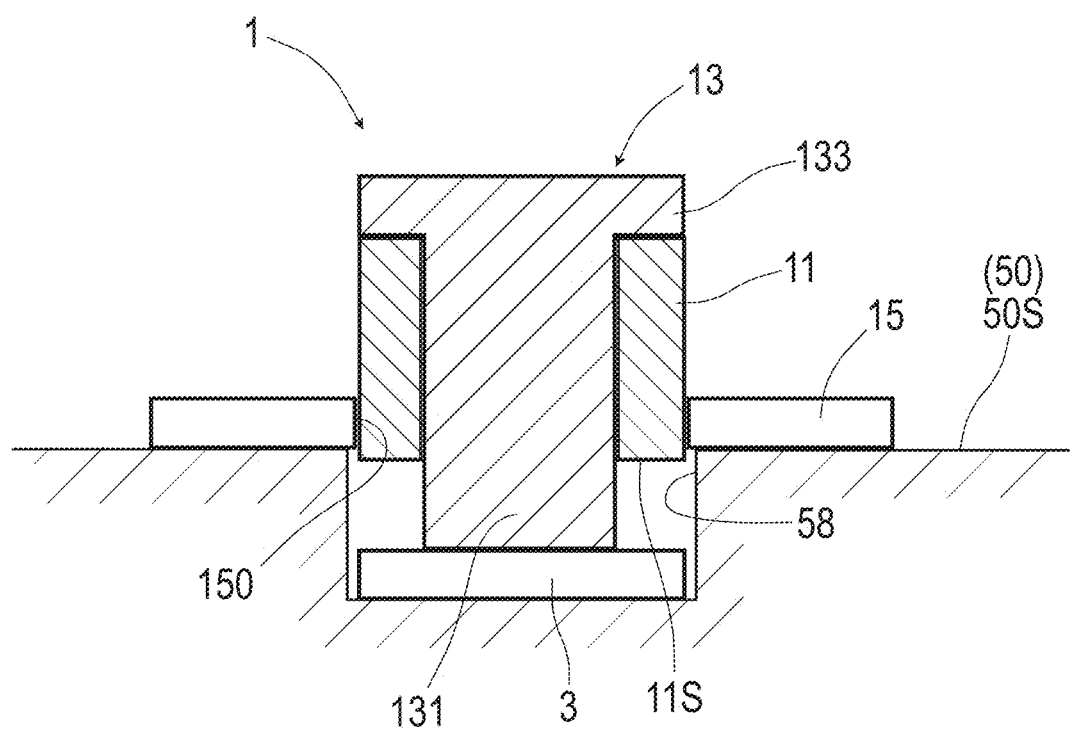
FIG. 11 is a descriptive diagram depicting a state in which the retaining member is pulled up.

By using the portion of shaft portion 131 left on the rear end side, it is possible to pull up retaining member 11 so that it is retreated in the axial direction as the state in which the tip of shaft portion 131 of detaching member 13 is pressed onto magnetic marker 3 is kept (refer to FIG. 11). By retreating retaining member 11 in the axial direction while pressing magnetic marker 3 onto the bottom surface of accommodation hole 58 by detaching member 13, it is possible to release magnetic coupling with retaining member 11 without influencing the attitude of magnetic marker 3.

Retaining member 11 can be moved to retreat in the axial direction without interfering detaching member 13 until abutting on flange portion 133 of detaching member 13. When retaining member 11 abuts on flange portion 133, the separation distance between magnetic marker 3 and retaining member 11 is 10 mm. If the separation distance of 10 mm is ensured, a magnetic force that can influence the attitude of magnetic marker 3 in accommodation hole 58 does not occur between retaining member 11 and magnetic marker 3.

After retaining member 11 abuts on flange portion 133 of detaching member 13, retaining member 11 is pulled upward together with detaching member 13 to be pulled out from accommodation hole 58. Detaching member 13 is the member made of resin such as nonmagnetic nylon, and magnetic marker 3 is not suctioned. Therefore, detaching member 13 can be pulled out from accommodation hole 58 without influencing the arrangement of magnetic marker 3 in accommodation hole 58. By pulling out retaining member 11 integrally with detaching member 13 from accommodation hole 58, it is possible to end the work for arranging magnetic marker 3 in accommodation hole 58. Then, by backfilling accommodation hole 58 with road repair material 507, it is possible to complete installation of magnetic marker 3.

As described above, supplemental tool 1 of the present embodiment is a useful tool for arranging magnetic marker 3 in accommodation hole 58 provided by being drilled in road surface 50S. By using supplemental tool 1, it is possible to efficiently perform a highly-accurate work for arranging magnetic marker 3 irrespective of the level of work skill, whether the worker has color-vision deficiency, and so forth.

Note that while the combination of retaining member 11 and detaching member 13 is a configuration imperative in supplemental tool 1, the configuration may not include reference plate 15. When magnetic marker 3 is arranged by using retaining member 11, there is an extremely low possibility that magnetic marker 3 tilts in accommodation hole 58. If accommodation hole 58 has a depth of 15 mm to the bottom surface compacted with high accuracy by rolling tool 109, it is less required to check the arrangement depth of magnetic marker 3. In this case, it is less required to measure the insertion depth of retaining member 11 by using reference plate 15.

Note that a procedure is performed in the present embodiment in which retaining member 11 for retaining magnetic marker 3 is inserted into accommodation hole 58, magnetic marker 3 is mounted on its bottom surface, and shaft portion 131 of detaching member 13 is then inserted into through-hole 110 of retaining member 11. In place of this, supplemental tool 1 may be prepared in which shaft portion 131 is inserted in advance into through-hole 110 so that the tip surface of shaft portion 131 is flush with retaining surface 11S. In this case, supplemental tool 1 in a state in which magnetic marker 3 is retained on retaining surface 11S and the tip surface of shaft portion 131 is in contact with that magnetic marker 3 is inserted into accommodation hole 58. For example, as in FIG. 12, a mechanism for restricting a range in which detaching member 13 advances and retreats to the axial direction as opposed to retaining member 11 may be provided so that shaft portion 131 does not protrude from retaining surface 11S.

Figure 12:
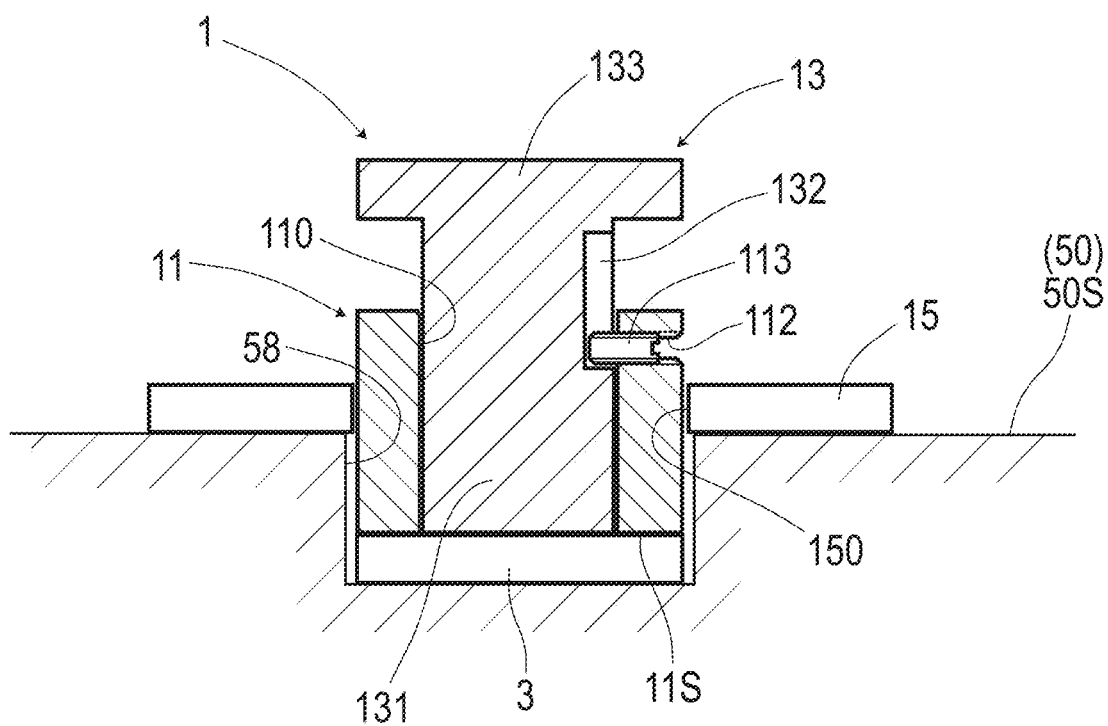
FIG. 12 is an assembly diagram of another supplemental tool No. 1.

In supplemental tool 1 of FIG. 12, groove 132 having a finite length along the axial direction is provided in shaft portion 131 (detaching member 13). In retaining member 11, screw hole 112 penetrating in a radial direction to be open to the inner circumferential surface of through-hole 110 is provided. In screw hole 112, hexagon socket set screw 113 is screwed. The tip of hexagon socket set screw 113 protrudes from the inner circumferential surface of through-hole 110 to be accommodated in groove 132 of detaching member 13. One end portion of the formation range of groove 132 is at a position corresponding to hexagon socket set screw 113 (refer to FIG. 12) when the tip surface of shaft portion 131 is flush with retaining surface 11S. The other end portion of the formation range of groove 132 is at a position corresponding to hexagon socket set screw 113 when retaining surface 11S retreats from the tip surface of shaft portion 131 (refer to FIG. 11). This combination of groove 132 having a finite length and hexagon socket set screw 113 achieves the mechanism that restricts the range in which retaining member 11 advances and retreats in the axial direction with respect to detaching member 13.

In the present embodiment, retaining member 11 that can magnetically suction magnetic marker 3 onto retaining surface 11S by using the magnetic force of magnetic marker 3 is exemplarily described. Retaining member 11 of the present embodiment does not generate a magnetic force by itself but the magnet is formed of the soft magnetic material that can be suctioned. In place of this, a retaining member formed of a permanent magnet may be adopted. For example, if the retaining member has retaining surface 11S forming the N pole, magnetic marker 3 can be retained with the S pole of magnetic marker 3 facing retaining surface 11S. For example, if installation is defined in a manner such that the S pole is oriented upward, it is possible to extremely efficiently install magnetic marker 3 by using the retaining member having the retaining surface 11S forming the N pole. At the time of installation, either one of the retaining member having retaining surface 11S forming the N pole and a retaining member having retaining surface 11S forming the S pole may be selectively used. In this case, it is possible to efficiently install a plurality of magnetic markers with a defined combination of magnetic polarities.

In the present embodiment, retaining member 11 that magnetically suction and retain magnetic marker 3 is exemplarily described. However, a method by the retaining member for retaining magnetic marker 3 is not limited to the magnetic suction method. As a method of retaining magnetic marker 3, various methods can be thought: for example, a method of retaining by a bonding force by a bonding material, a method of retaining an adhesive force by an adhesive material, a method of retaining by negative pressure, a method of retaining by using a suction cup, and so forth.

Figure 13:
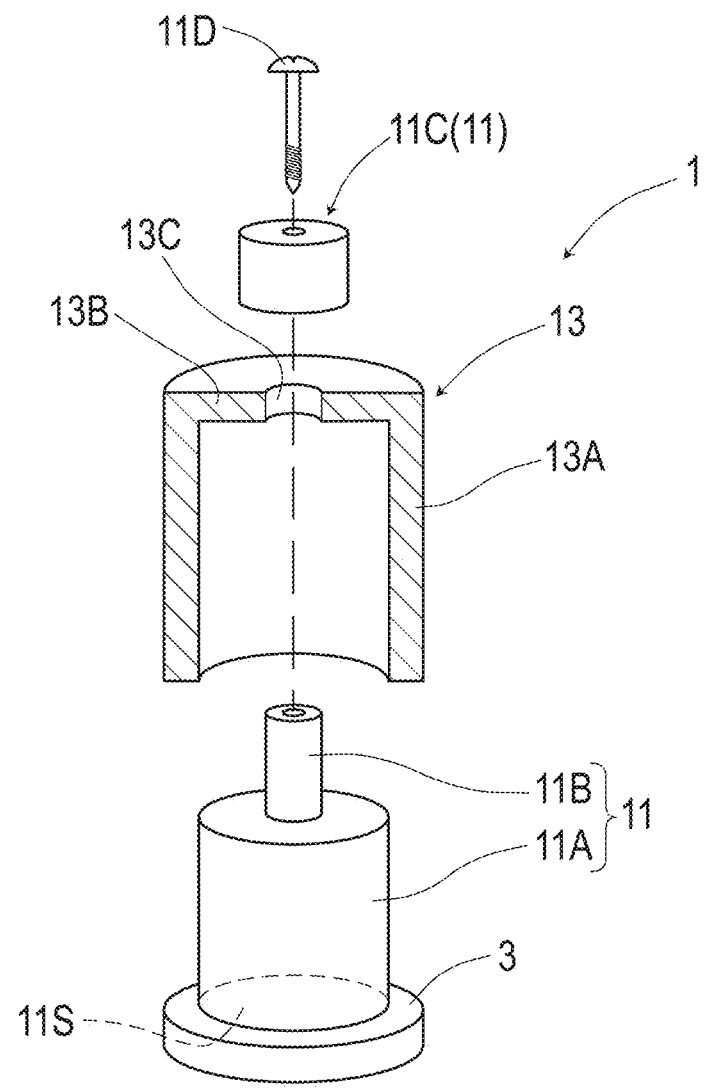
FIG. 13 is a configuration diagram of another supplemental tool No. 2.
Figure 14:
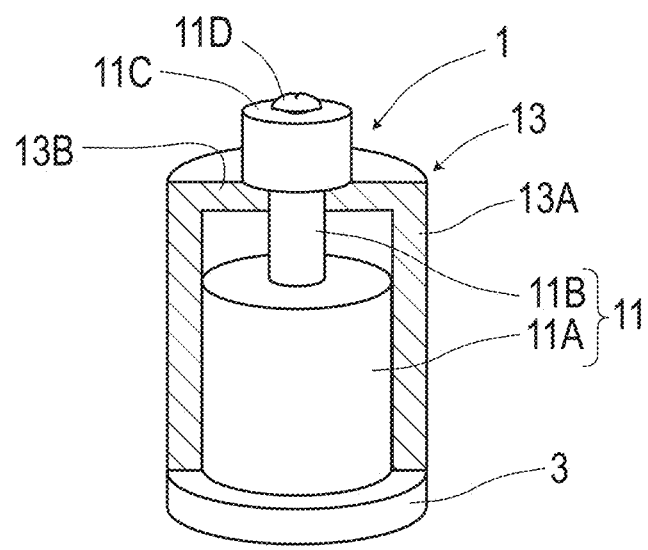
FIG. 14 is an assembly diagram of another supplemental tool No. 2.

Supplemental tool 1 of the present embodiment has a structure in which detaching member 13 is inserted into retaining member 11. Supplemental tool 1 may have a structure in which, as in FIG. 13 and FIG. 14, detaching member 13 is externally inserted to retaining member 11. FIG. 13 depicts an assembling structure, and FIG. 14 depicts an assembled state. Retaining member 11 is configured to include shaft portion 11B and barrel portion 11A. At the tip of shaft portion 11B, handle 11C having a large diameter is fixed with screw 11D. Barrel portion 11A is formed of carbon steel, which is a soft magnetic material, and its tip surface is retaining surface 11S that magnetically suction and retain magnetic marker 3.

Detaching member 13 of FIG. 13 and FIG. 14 is a member made of resin such as nonmagnetic nylon. Detaching member 13 has a shape like a cylindrical cup turned upside down. In bottom portion 13B, hole 13C for letting shaft portion 11B of retaining member 11 penetrate therethrough is provided. The dimension of the inner space of cylindrical portion 13A of detaching member 13 in the axial direction is longer by 10 mm than barrel portion 11A of retaining member 11.

In supplemental tool 1 of FIG. 13 and FIG. 14, handle 11C of retaining member 11 functions as a pull-out prevention member. Thus, retaining member 11 and detaching member 13 are integrated. Retaining member 11 can advance and retreat in the axial direction with respect to detaching member 13 in a state in which shaft portion 11B is arranged to penetrate through hole 13C of bottom portion 13B (detaching member 13). The range in which retaining member 11 can advance and retreat is a range from a advancing position where the end face of cylindrical portion 13A of detaching member 13 is flush with retaining surface 11S (position depicted in FIG. 14) to a retreating position where barrel portion 11A abuts on bottom portion 13B of detaching member 13. The position depicted in FIG. 14 is a position restricted by handle 11C abutting on the upper surface (outer surface of bottom portion 13B) of detaching member 13.

To perform the work for arranging magnetic marker 3, magnetic marker 3 is suctioned onto retaining surface 11S of retaining member 11 positioned at the above-described advancing position. When retaining member 11 is positioned at the advancing position, the end face of cylindrical portion 13A is flush with retaining surface 11S. Therefore, detaching member 13 (cylindrical portion 13A) abuts on magnetic marker 3 suctioned onto retaining surface 11S (state depicted in FIG. 14). In this state, with supplemental tool 1 inserted into accommodation hole 58, magnetic marker 3 is arranged on the bottom surface of accommodation hole 58. Then, handle 11C is pulled up keeping the state in which detaching member 13 abuts on magnetic marker 3, and retaining member 11 is moved to the above-described retreating position where barrel portion 11A abuts on bottom portion 13B of detaching member 13. With this, magnetic coupling between retaining member 11 and magnetic marker 3 can be released. Then, by pulling out supplemental tool 1 from accommodation hole 58, it is possible to end the work for arranging magnetic marker 3 in accommodation hole 58.

Figure 15:
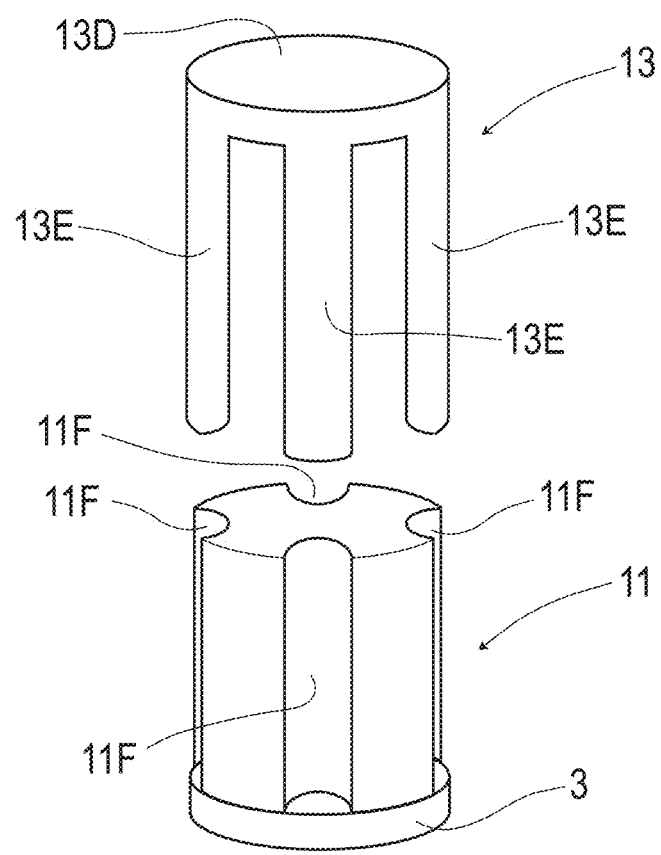
FIG. 15 is a configuration diagram of another supplemental tool No. 3.

Furthermore, supplemental tool 1 of FIG. 15 may be adopted. Retaining member 11 in the drawing is a columnar-shaped member having a sectional shape provided with notches 11F at four locations in a circumferential direction. Detaching member 13 has four leg portions 13E corresponding to notches 11F of retaining member 11 and top plate 13D supporting four leg portions 13E in a cantilever manner. Supplemental tool 1 with retaining member 11 and detaching member 13 combined so that leg portions 13E are arranged in notches 11F has a circular sectional shape having an outer diameter of 30 mm, which can be inserted into accommodation hole 58. Each of four leg portions 13E has a length in the axial direction longer than the length of columnar-shaped retaining member 11 in the axial direction by 10 mm. The tip of each leg portion 13E is an abutting surface to magnetic marker 3 mounted on the bottom surface of accommodation hole 58.

Figure 16:
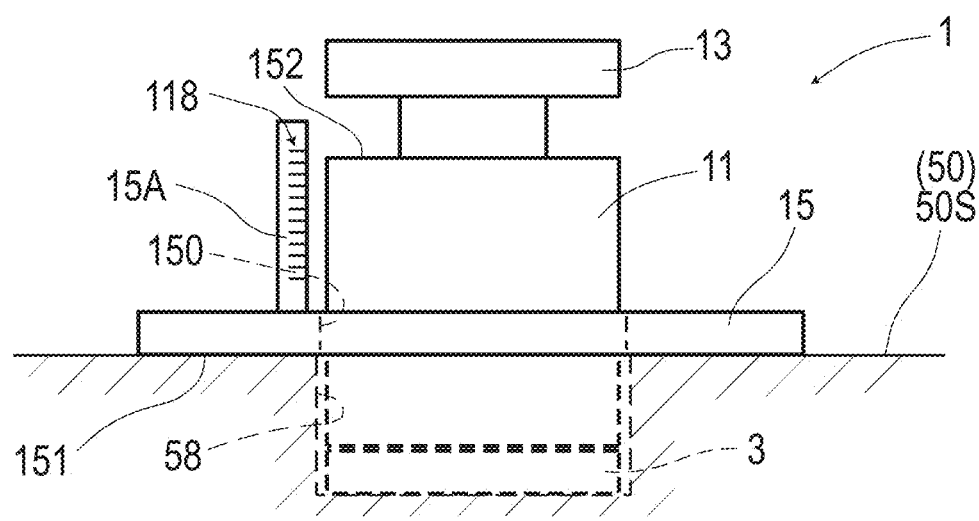
FIG. 16 is a descriptive diagram of a method of using a supplemental tool including a reference plate with a ruler provided vertically.

FIG. 16 depicts an example of supplemental tool 1 including reference plate 15 with ruler 15A provided vertically. This reference plate 15 has a surface opposite to a surface where ruler 15A is provided, the surface forming grounding portion 151 facing road surface 50S. In retaining member 11 of the drawing, the scale lines on the outer circumferential surface are omitted. An upper end face of retaining member 11 serves as reference portion 152 to be compared with scale 118 of ruler 15A, thereby allowing measurement of an insertion depth of retaining member 11. A mark (at a single place) for comparison with scale 118 of ruler 15A may be provided to the outer circumferential surface of retaining member 11.

Figure 17:
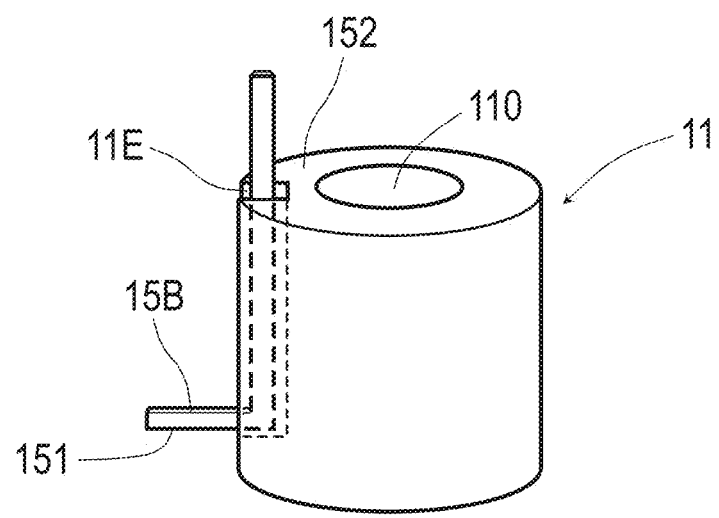
FIG. 17 is a perspective view of the retaining member including a L-angle ruler.
Figure 18:
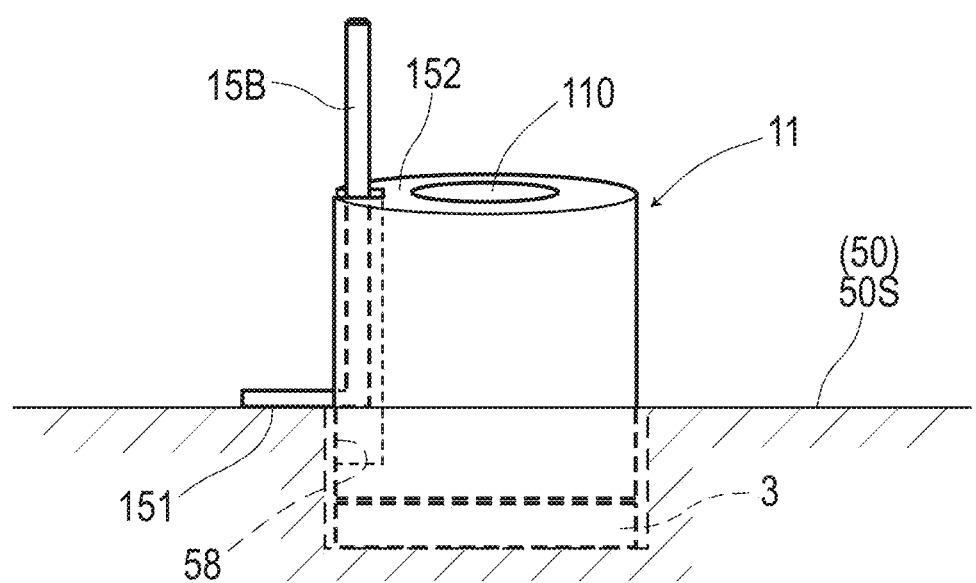
FIG. 18 is a descriptive diagram of a method of using the retaining member including the L-angle ruler.

FIG. 17 depicts an example of retaining member 11 including L-angle ruler 15B, which is one example of a measurement member. Note that depiction of the detaching member is omitted in the drawing. On the outer circumferential surface of retaining member 11, groove 11E along the axial direction is provided. In groove 11E, L-angle ruler 15B forming an L shape is retained so as to be able to advance and retreat along an extending direction of groove 11E. One of two sides of L-angle ruler 15B forming the L shape goes along the axial direction, and is retained in groove 11E so as to be able to advance and retreat in the axial direction. This one side is provided with a scale omitted in the drawing. The other of the two sides of L-angle ruler 15B forming the L shape protrudes to the outer circumferential side of retaining member 11. When the retaining member 11 is inserted into the accommodation hole 58, this other side serves as grounding portion 151 to abut on road surface 50S (FIG. 18). In accordance with the insertion depth of retaining member 11 into accommodation hole 58, L-angle ruler 15B is moved to the axial direction. The upper end face of retaining member 11 can be taken as reference portion 152 for comparison with a scale of L-angle ruler 15B, and the insertion depth of retaining member 11 into accommodation hole 58 can be measured. Note that a mark (at a single place) for comparison with the scale of L-angle ruler 15B may be provided to the outer circumferential surface of retaining member 11.

In the foregoing, while specific examples of the present invention are described in detail as in the embodiments, these specific examples merely disclose examples of technology included in the scope of the claims. Needless to say, the scope of the claims should not be restrictively construed based on the configuration, numerical values, and so forth of the specific examples. The scope of the claims includes technologies acquired by variously modifying, changing, or combining as appropriate the above-described specific examples by using known technologies, knowledge of a person skilled in the art, and so forth.

The invention claimed is:

1. A supplemental tool for installing a magnetic marker for arranging, when the magnetic marker externally acting with magnetism is installed, the magnetic marker in an accommodation hole provided by being drilled in a road surface, the supplemental tool for installation comprising:
    a columnar-shaped retaining member including a retaining surface for the magnetic marker at an end portion in an axial direction of the retaining member;
    a detaching member to be combined with the retaining member that is movable in the axial direction with respect to the retaining member; and
    a measuring member including a grounding portion facing the road surface,
    wherein, in a combination of the retaining member and the detaching member, the detaching member is positioned in contact with the magnetic marker retained on the retaining surface, and the retaining member is configured to retreat in the axial direction from the magnetic marker while keeping a state in which the detaching member is in contact with the magnetic marker,
    wherein an insertion depth of the retaining member into the accommodation hole is measured or checked in accordance with a relative position in a height direction between the retaining member inserted into the accommodation hole and the measuring member with the grounding portion in contact with the road surface.

2. The supplemental tool for installing the magnetic marker in claim 1, wherein
    the retaining surface of the columnar-shaped retaining member is formed of a soft magnetic material to retain the magnetic marker by magnetic suction, and
    at least a portion of the detaching member abutting on the magnetic marker is made of a nonmagnetic material.

3. The supplemental tool for installing the magnetic marker in claim 1, wherein either one of the retaining member and the measuring member is provided with a mark or a scale, and another one includes a reference portion for comparing the relative position in the height direction to the mark or the scale.

4. The supplemental tool for installing the magnetic marker in claim 1, wherein
    the measuring member includes a flat plate shape provided with an arrangement portion where the retaining member inserted into the accommodation hole penetrates therethrough,
    a mark or a scale is provided on an outer circumferential surface of the retaining member, and
    a portion of the mark or the scale that is hidden from an outside due to the measuring member and a portion of the mark or the scale that is visually recognized from the outside vary in accordance with an insertion depth of the retaining member into the accommodation hole.

5. The supplemental tool for installing the magnetic marker in claim 1, wherein
    the retaining member has a through hole penetrating the retaining member in the axial direction,
    the detaching member has a shaft portion that is inserted into the through hole, and the shaft portion is longer than the through hole in the axial direction, and
    in the combination of the retaining member and the detaching member, the detaching member is configured to move in the axial direction with respect to the retaining member in a state in which the shaft portion is inserted into the through hole.

6. The supplemental tool for installing the magnetic marker in claim 5, wherein
    the retaining surface of the columnar-shaped retaining member is formed of a soft magnetic material to retain the magnetic marker by magnetic suction, and
    at least a portion of the detaching member abutting on the magnetic marker is made of a nonmagnetic material.

7. A magnetic marker installation method for arranging, when a magnetic marker externally acting with magnetism is installed, the magnetic marker in an accommodation hole provided by being drilled in a road surface, the magnetic marker installation method comprising:
    providing a columnar-shaped retaining member including a retaining surface for the magnetic marker at an end portion in an axial direction of the retaining member, and a detaching member to be combined with the retaining member so as to be movable in the axial direction with respect to the retaining member,
    inserting the retaining member into the accommodation hole with the retaining surface retaining the magnetic marker on a tip side, and
    retreating the retaining member in the axial direction to a side away from the magnetic marker and pulling out the retaining member from the accommodation hole keeping a state in which the detaching member abuts on the magnetic marker retained on the retaining surface.

* * * * *